(12) United States Patent
Rosthauser

(10) Patent No.: US 8,003,205 B2
(45) Date of Patent: Aug. 23, 2011

(54) SPRAY-APPLIED POLYURETHANEUREA COMPOSITES BASED ON POLYISOCYANATE PREPOLYMERS CONTAINING SOFT-SEGMENTS

(75) Inventor: James W. Rosthauser, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 1162 days.

(21) Appl. No.: 11/520,891

(22) Filed: Sep. 14, 2006

(65) Prior Publication Data

US 2008/0071058 A1  Mar. 20, 2008

(51) Int. Cl.
*B32B 3/26* (2006.01)

(52) U.S. Cl. ............... 428/318.6; 428/319.3; 428/423.1; 428/315.5; 428/318.4; 428/234; 428/363; 524/589; 524/590; 524/591; 524/839; 524/840

(58) Field of Classification Search .................. 524/701, 524/412, 589, 590, 591, 839, 840; 521/159; 428/423.1, 319.3, 318.6, 315.5, 318.4, 324, 428/363

See application file for complete search history.

(56) References Cited

U.S. PATENT DOCUMENTS

| | | | | |
|---|---|---|---|---|
| 5,104,693 | A | | 4/1992 | Jenkines .................. 427/244 |
| 5,192,594 | A | | 3/1993 | Madan et al. ............. 427/421 |
| 5,233,009 | A | | 8/1993 | Madan et al. ............. 528/60 |
| 5,275,888 | A | * | 1/1994 | Madan et al. ............. 428/423.3 |
| 5,302,303 | A | | 4/1994 | Clatty et al. ............... 252/6.5 |
| 5,567,763 | A | * | 10/1996 | Madan et al. ............. 524/701 |
| 5,856,371 | A | * | 1/1999 | Grimm et al. ............. 521/159 |
| 2005/0075450 | A1 | | 4/2005 | Raday et al. .............. 524/589 |

FOREIGN PATENT DOCUMENTS

| | | |
|---|---|---|
| EP | 1 783 150 A1 | 5/2007 |
| WO | 99/66856 A1 | 12/1999 |

* cited by examiner

*Primary Examiner* — Milton I Cano
*Assistant Examiner* — Michael Leonard
(74) *Attorney, Agent, or Firm* — N. Denise Brown; Noland J. Cheung

(57) ABSTRACT

This invention relates to sprayable polyurethaneurea compositions, composite articles comprising at least one layer of these polyurethaneurea compositions and at least one layer of a polyurethaneurea foam forming composition, and to a process for the production of these composites.

9 Claims, No Drawings

SPRAY-APPLIED POLYURETHANEUREA COMPOSITES BASED ON POLYISOCYANATE PREPOLYMERS CONTAINING SOFT-SEGMENTS

BACKGROUND OF THE INVENTION

1. Field of the Invention

This invention relates to composite parts comprising sprayed polyurethaneureas and to a process for their production.

2. Description of Related Art

Composite articles and processes for preparing composite articles are known and described in various references. Composite articles which may be fiber-reinforced and have an aesthetic visual surface are suitable for use as pleasure craft hulls, personal watercraft, sea plane pontoons, hot tubs, bathtubs, swimming pools and other items used in aqueous environments. A multi-step process is known for making various watercraft hulls and fiberglass reinforced articles. Polyurethanes and polyureas have been used to make structural supports, composite articles and sandwich structures for a number of years.

Polyurethane and polyurea composites and processes for the production of these composites is described in, for example, U.S. Pat. Nos. 5,192,594, 5,233,009, and 5,275,888, and U.S. Published Patent Application 2005/0075450.

U.S. Pat. No. 5,192,584 discloses a process of preparing polyurethaneurea structural supports in which a polyurethane is sprayed onto a substrate. The polyurethane is the reaction product of a specific polyol blend, an organic diamine and an isocyanate component, in the presence of a moisture absorbing material and a polysiloxane defoaming agent. These polyurethanes can be spray applied to a substrate.

A process for the preparation of composite structures comprising a ceramic layer and polyurethane layers and the polyurethane compositions used in this process are disclosed in U.S. Pat. Nos. 5,233,009 and 5,275,888. These composites are suitable for use in plumbing applications including bathtubs. The polyurethanes comprise a specific polyol blend, an organic diamine, fillers and an isocyanate-terminated prepolymer. Composite structures can be prepared by spray applying these polyurethanes to an adhesive coated ceramic enamel layer.

Fiber reinforced composites prepared from a polyurethane system are described in U.S. Published Patent Application 2005/0075450. These polyurethanes comprise a highly hydrophobic polyol component with an isocyanate prepolymer, in which the combination has a combined functionality of greater than 5. These systems are suitable as gel coats and matrix resins, and produce little to no volatile emissions. Boat hulls and other similar products can be produced from these systems.

Polyurethane sandwich structure elements and a process for the production of these are disclosed in U.S. Pat. No. 5,856,371. These sandwich structures are self-supporting and comprise at least one non-cellular polyurethane layer and at least one polyurethane foamed layer, with the non-cellular layer containing 10 to 55% by weight of mica. The mixtures used to form each polyurethane layer contain a polyether polyol having an OH number of 250 to 400, a semi-prepolymer based on diphenylmethane diisocyanate and a polyether polyol and which have an NCO group content of 20 to 30%, and optionally, foaming agents, with the mixtures being reacted at an isocyanate index of 90 to 130.

U.S. Pat. No. 5,104,693 discloses polyurethane backed substrates such as carpet cushions. The polyurethane foaming composition comprises a soft segment prepolymer of diphenylmethane diisocyanate or a derivate thereof, an isocyanate-reactive mixture having an average equivalent weight of 1000 to 5000, and an effective amount of a blowing agent.

Advantages of the present invention include ease in processing, lower reaction exotherm, and most importantly, better impact resistance in the resulting PUR composite. Ease in processing is accomplished by utilizing a prepolymer so that the viscosity of it and the polyol blend coreactant are more equal than in systems using unmodified polyisocyanates. This eases mixing of the two components but also may make it possible to utilize more convenient mix ratios by volume (e.g. 1:1 and 1:2). Utilizing prepolymers also limits the amount of heat which evolves in the curing reaction so that heat sensitive substrates (e.g. thermoplastic shells or gel coats) are less affected. Most importantly, the impact resistance of the PUR is improved compared to that of systems that do not contain soft segments or one that contain these soft segments solely in the coreactant portion (i.e. non-isocyanate portion) of the PUR system.

SUMMARY OF THE INVENTION

This invention relates to sprayable polyurethaneureas, composite articles comprising at least one solid (i.e. non-cellular) layer of these sprayable polyurethaneureas, and at least one polyurethaneurea foam layer which is also sprayable. This invention is also directed to a process for the production of these composites.

The sprayable polyurethaneureas of the invention comprise
- (A) an isocyanate prepolymer having an NCO group content of about 15 to about 30% by weight, and which comprises the reaction product of
  - (1) one or more diphenylmethane diisocyanate, which is optionally modified with allophanate groups and/or carbodiimide groups,
  - with
  - (2) a polyether polyol having a functionality of about 1.8 to about 3.5 and a molecular weight of about 1500 to about 8000;
- and
- (B) an isocyanate-reactive component comprising:
  - (1) no more than 5% by weight of one or more high molecular weight polyether polyols having a functionality of about 1.8 to about 3.5 and a molecular weight of about 1500 to about 8000;
  - (2) from about 90 to about 98% by weight of one or more crosslinking agents having a molecular weight of 200 to less than 1500 and a functionality of about 2.5 to about 8;
  - and
  - (3) from about 0.5 to 10% by weight of at least one chain extender having a functionality of about 2 and a molecular weight of about 60 to about 250;
  - with the sum of the percentage's by weight of (B)(1), (B)(2) and (B)(3) totaling 100% by weight of component (B);

at an isocyanate index of about 95 to about 120.

The composites of the invention comprise:
- (I) at least one layer of a sprayable polyurethaneurea as described above and which is solid,
- and
- (II) at least one layer of a polyurethaneurea foam which is sprayable, in which the polyurethaneurea foam comprises the reaction product of a polyisocyanate, an isocyanate-reactive component and water.

The process for the production of these composites comprises:
(A) spraying (I) the above described polyurethaneurea composition onto a suitable substrate; and
(B) spraying (II) a polyurethaneurea foam layer as described above onto the polyurethaneurea coated substrate in (A).

DETAILED DESCRIPTION OF THE INVENTION

As is commonly used in PUR technology, the terms polyurethane is commonly used to denote systems that also contain urea groups, and should therefore correctly be referred to as "polyurethaneurea".

Suitable isocyanate prepolymers to be used as component (A) in accordance with the present invention include those having an NCO group content of about 15 to about 30%, preferably 15 to 25%, and more preferably 15 to 20%. These isocyanate prepolymers comprise the reaction product of (1) diphenylmethane diisocyanate or polyphenylmethylene polyisocyanate, with (2) at least one polyether polyol having a functionality of about 1.8 to about 3.5 and a molecular weight of about 1500 to about 8000.

The diphenylmethane diisocyanates to be used as component (1) in the isocyanate prepolymers comprise from 0 to 60% (preferably 0 to 30% and more preferably 0 to 10%) by weight of the 2,4-isomer, from 0 to 6% (preferably 0 to 4% and more preferably 0 to 2%) by weight of the 2,2'-isomer and from 36 to 100% (preferably 66 to 99% and more preferably 88 to 98%) by weight of the 4,4'-isomer, with the sum of the %'s by weight of the three isomers totaling 100% by weight.

Polyphenylmethane polyisocyanates (i.e. polymeric MDI or PMDI) are also suitable to be used in admixture with the above described isocyanate prepolymers. These typically comprise from 30 to 70% by weight of monomeric isocyanate and from 70 to 30% by weight of higher homologues of the diphenylmethane diisocyanate series. The monomeric isocyanate component typically comprises 0 to 60% (preferably 0 to 30% and more preferably 0 to 10%) by weight of the 2,4'-isomer, from 0 to 6% (preferably 0 to 4% and more preferably 0 to 2%) by weight of the 2,2'-isomer and from 36 to 100% (preferably 66 to 99% and more preferably 88 to 98%) by weight of the 4,4'-isomer, with the sum of the %'s by weight of the three isomers totaling 100% by weight of the monomer.

The amount of polymeric MDI that can be added to the prepolymer component in accordance with the present invention ranges from 0 to 50% by weight based on 100% by weight of all isocyanate components. This amount of polymeric MDI is preferably in the range of from 0 to 30% by weight, more preferably 0 to 25% by weight, and most preferably of from 0 to 20% by weight. In a preferred embodiment of the invention, the isocyanate component comprises a mixture of a MDI prepolymer (or prepolymer of an adduct) and polyphenylmethane diisocyanate.

In an optional embodiment of the present invention, a portion of the polyisocyanate component may be present in the form of a polyisocyanate adduct. Suitable polyisocyanate adducts include those containing allophanate and/or carbodiimide groups. The polyisocyanate adducts have an average functionality of 2.0 to 4 and a NCO content of 5 to 32% by weight. Suitable adducts include the following type of components: allophanate group-containing polyisocyanates and carbodiimide group-containing polyisocyanates. In accordance with the present invention, it is preferred that the isocyanate used as (A)(1) contain allophanate groups.

The NCO prepolymers of the present invention are prepared from the previously described polyisocyanates or polyisocyanate adducts, preferably monomeric diisocyanates, with at least one polyether polyol having a functionality of about 1.8 to about 3.5 (preferably 2.0 to 3.0) and a molecular weight of about 1500 to about 8000 (preferably 2000 to 6000). The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

These high molecular weight polyether polyols typically have a molecular weight of at least about 1,500, and preferably at least about 2,000. The high molecular weight polyether polyols also typically have a molecular weight of less than or equal to about 8,000, and preferably of less than or equal to about 6,000. In addition, the high molecular weight polyether polyol may also have molecular weight ranging between any combination of these upper and lower values, inclusive, e.g. from 1,500 to 8,000, and preferably from 2,000 to 6,000.

The functionality of the high molecular weight polyether polyol is typically at least about 1.8, and preferably at least about 2.0. The functionality of the high molecular weight polyether polyol is also typically less than or equal to about 3.5, and preferably less than or equal to about 3.0. In addition, the high molecular weight polyether polyol may have a functionality ranging between any combination of these upper and lower values, inclusive, e.g. from about 1.8 to about 3.5, and preferably from about 2.0 to about 3.0.

Suitable polyether polyols for component (A)(2) include both conventional polyether polyols which are KOH catalyzed and inherently contain a certain amount of unsaturation and those polyether polyols which are low unsaturation polyether polyols. The low unsaturation polyether polyols are typically DMC catalyzed.

The KOH catalyzed polyether polyols suitable herein are known in the art and may be prepared by the reaction of one or more suitable starting compounds which contain reactive hydrogen atoms with alkylene oxides such as, for example, ethylene oxide, propylene oxide, butylene oxide, styrene oxide, tetrahydrofuran, epichlorohydrin, and mixtures thereof. Suitable starting compounds containing reactive hydrogen atoms include compounds such as, for example, ethylene glycol, propylene glycol, butylene glycol, hexanediol, octanediol, neopentyl glycol, cyclohexandimethanol, 2-methyl-1,3-propanediol, 2,2,4-trimethyl-1,3-pentanediol, triethylene glycol, tetraethylene glycol, polyethylene glycol, dipropylene glycol, tripropylene glycol, polypropylene glycol, dibutylene glycol, polybutylene glycol, glycerine, trimethylolpropane, pentaerythritol, water, methanol, ethanol, 1,2,6-hexane triol, 1,2,4-butane triol, trimethylol ethane, mannitol, sorbitol, methyl glycoside, sucrose, phenol, resorcinol, hydroquinone, 1,1,1- or 1,1,2-tris (hydroxyphenyl)ethane, etc.

The low unsaturation polyether polyols which are suitable for component (A)(2) of the present invention have a maximum amount of 0.01 meq/g of unsaturation, preferably no more than 0.007 meq/g unsaturation. These low unsaturation polyether polyols are known and described in, for example, U.S. Pat. Nos. 5,106,874, 5,576,382, 5,648,447, 5,670,601, 5,677,413, 5,728,745, 5,849,944 and 5,965,778, the disclosures of which are herein incorporated by reference.

The isocyanate-reactive component, i.e. component (B), of the polyurethaneurea layer herein comprises:

(1) no more than 5%, preferably 0 to 3% by weight of at least one high molecular weight polyether polyol having a functionality of 1.8 to 3.5 and a molecular weight of 1500 to 8,000;

(2) from about 90 to about 99% preferably 92 to 98% by weight of at least one crosslinking agent having a functionality of 2.5 to 8 and a molecular weight of 200 to less than 1,500; and (3) from about 0.5 to about 10%, preferably 2 to 5% by weight of at least one chain extender having a functionality of about 2 and a molecular weight of about 60 to about 250;

with the sum of the %'s by weight of (1), (2) and (3) totaling 100% by weight of component (B).

Suitable high molecular polyether polyols used as component (1) of the isocyanate-reactive component (B) herein typically have a molecular weight of at least about 1,500, and preferably at least about 2,000. The high molecular weight polyether polyols for component (a) also typically have a molecular weight of less than or equal to about 8,000, and preferably of less than or equal to about 6,000. In addition, the high molecular weight polyether polyol may also have molecular weight ranging between any combination of these upper and lower values, inclusive, e.g. from 1,500 to 8,000, and preferably from 2,000 to 6,000.

The functionality of the high molecular weight polyether polyol is typically at least about 1.8, and preferably at least about 2.0. The functionality of the high molecular weight polyether polyol is also typically less than or equal to about 3.5, and preferably less than or equal to about 3.0. In addition, the high molecular weight polyether polyol may have a functionality ranging between any combination of these upper and lower values, inclusive, e.g. from about 1.8 to about 3.5, and preferably from about 2.0 to about 3.0.

Suitable polyether polyols for component (1) include both conventional polyether polyols which are KOH catalyzed and inherently contain a certain amount of unsaturation, and those polyether polyols which are low unsaturation polyether polyols. The low unsaturation polyether polyols are typically DMC catalyzed. Additional details concerning these polyether polyols can be found above in the description of the polyether polyols suitable for the preparation of the isocyanate prepolymers, i.e. component (A)(2).

Often high molecular weight polyethers of this type are used as carriers for various additives used in polyurethane formulations. This avoids addition of many of these additives in their natural solid form. Examples are pigments and colorants, flow aids, moisture scavengers, catalysts, UV stabilizers and the like. Addition of these materials can lead to unintentional incorporation of the high molecular weight polyethers into the isocyanate reactive component and should be limited to the amounts stated herein.

Suitable compounds to be used as crosslinking agents, i.e. component (2) of the isocyanate-reactive component (B) herein, typically has a molecular weight of at least about 200, and preferably at least about 300. Suitable crosslinking agents for component (b) also typically have a molecular weight of less than about 1,500, and preferably of less than or equal to about 1,000. In addition, the crosslinking agent may also have molecular weight ranging between any combination of these upper and lower values, inclusive (unless otherwise noted), e.g. from 200 to less than 1,500, and preferably from 300 to 1,000.

The functionality of the crosslinking agent is typically at least about 2.5, and preferably at least about 3.0. The functionality of the crosslinking agent is also typically less than or equal to about 8, and preferably less than or equal to about 6.0.

In addition, the crosslinking agent may have a functionality ranging between any combination of these upper and lower values, inclusive, e.g. from about 2.5 to about 8.0, and preferably from about 3.0 to about 6.0.

Examples of suitable compounds to be used as crosslinking agents in accordance with the present invention include, for example, compounds such as diols, triols, polyols, diamines, triamines, etc, and mixtures thereof, and the various alkoxylation products thereof, etc. provided that the above described molecular weight and/or functionality ranges are satisfied. Specifically, the various ethylene oxide adducts and/or propylene oxide adducts based on these compounds are preferred, provided that the molecular weight of the adducts satisfy the above requirements with respect to molecular weight. Suitable diols, triols, and polyols, etc. to be used as possible starters include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, trimethylolethane, neopentyl glycol, cyclohexanedimethanol, 2,2,4-trimethylpentane-1,3-diol, pentaerythritol, dipentaerythritol, glucose, sucrose, sorbitol, lactose, mannitol, fructose, hydrolyzed starches, saccharide and polysaccharide derivatives such as alpha-methylglucoside and alpha-hydroxyethyl-glycoside, etc. Suitable diamines and triamines include but are not limited to ethylene diamine, toluene diamine, diethylenetriamine, ammonia, aminoalcohols which can be prepared by the alkoxylation of ammonia, 2,4'-, 2,2'- and 4,4'-methylene dianiline, 2,6- and/or 2,4-toluene diamine and vicinal toluene diamines, p-aminoaniline, 1,5-diaminonaphthalene, mixtures of methylene dianiline and its higher homologs, ethylene diamine, propylene diamine, diethylene triamine, 1,3-diaminopropane, 1,3-diaminobutane and 1,4-diaminobutane. Ethylene diamine and toluene diamines are particularly preferred. Preferred polyols to be used as starters include, for example, trimethylolpropane, glycerine, sucrose, sorbitol, as well as propylene oxide adducts and ethylene oxide/propylene oxide adducts of these compounds.

A particularly preferred class of compound to be used as crosslinking agents in accordance with the present invention have a molecular weight of about 350 to 500, a functionality of about 4, and OH numbers of about 450 to 650, and comprise the propoxylation adducts of ethylene diamine.

Another particularly preferred class of compounds to be used as crosslinking compounds are the propoxylation adducts of sucrose or mixtures of sucrose and water with molecular weights 450 to 1000, functionalities of 3 to 6, and OH numbers of about 330 to 380. Mixtures of compounds of this particular class can be used to give functionalities between 3 and 6 and are particularly preferred.

In a preferred embodiment, component (B)(2) the one or more crosslinking agents comprise (a) from 10 to 90% by weight of at least one sucrose initiated crosslinking agent, and particularly one or more crosslinking compounds which are the propoxylation adducts of sucrose or mixtures of sucrose and water with molecular weights 450 to 1000, functionalities of 3 to 6, and OH numbers of about 330 to 380; and (b) from 10 to 90% by weight of at least one amine initiated crosslinking agent, and particularly one or more crosslinking compounds which are the propoxylation adducts of ethylene diamine and have molecular weights of about 350 to 500, a functionality of about 4, and OH numbers of about 450 to 650;

with the sum of (a) and (b) totaling 100% by weight of the crosslinking agent (B)(2).

Suitable compounds to be used as chain extenders, i.e. component (3) of the isocyanate-reactive component (B) herein, typically have a molecular weight of at least about 60, and preferably at least about 100. Suitable chain extending agents for component (B)(3) also typically have a molecular weight of less than or equal to about 250, and preferably of less than or equal to about 200. In addition, the chain extenders may also have molecular weight ranging between any combination of these upper and lower values, inclusive (unless otherwise noted), e.g. from 60 to about 250, and preferably from 100 to 200.

In accordance with the present invention, suitable chain extenders to be used as component (B)(3) typically have a functionality of about 2. Suitable chain extenders may contain hydroxyl groups, amine groups or a one hydroxyl group and one amine group (i.e. aminoalcohols). In accordance with the present invention, it is particularly preferred to use chain extenders containing amine groups. In the case where diols are utilized as chain extenders, they are always used in combination with diamines. Diamines are preferred chain extenders.

Suitable compounds to be used as chain extenders, i.e. component (B)(3), in accordance with the present invention include, for example, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexanedimethanol, 2-methyl-1,3-propanediol, and 2,2,4-trimethylpentane-1,3-diol.

Suitable amine compounds to be used as component (B)(3) according to the invention include organic primary amines, secondary amines, and amino alcohols. Some examples of these compounds include 2-methyl-1,5-pentane diamine, diethanolamine, monoethanolamine, triethanolamine, N-methyldiethanolamine, N-ethyldiethanolamine, N-ethylaminodiethanolamine, ethylene diamine (EDA), 1,3-diaminopropane, 1,4-diaminobutane, isophoronediamine (IPDA), aminoethylethanolamine, diaminocyclohexane, hexamethylenediamine, methyliminobispropylamine, iminobispropylamine, bis(aminopropyl)-piperazine, aminoethyl piperazine, 1,2-diaminocyclo-hexane, bis-(p-aminocyclohexyl) methane, mixtures thereof, and the like.

Other suitable amines include, for example, 1,3,3-trimethyl-1-aminomethyl-5-aminocyclohexane (IPDA), 1,8-p-diaminomenthane, bis(4-aminocyclohexyl)methane, bis(4-amino-3-methylcyclohexyl)-methane, bis(4-amino-3,5-dimethylcyclohexyl)methane, bis(4-amino-2,3,5-trimethylcyclohexyl)methane, 1,1-bis(4-aminocyclohexyl) propane, 2,2-(bis(4-aminocyclohexyl)propane, 1,1-bis(4-aminocyclohexyl)ethane, 1,1-bis(4-aminocyclohexyl) butane, 2,2-bis(4-aminocyclohexyl)butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethylcyclohexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-aminocyclohexyl)-2-(4-amino-3-methylcyclohexylmenthane)methane.

Also suitable are aromatic diamines such as, for example, 1,4-diaminobenzene, 1,3-bis(aminomethyl)benzene (MXDA), 2,4- and/or 2,6-diaminotoluene, 2,4'- and/or 4,4'-iaminodiphenylmethane, 3,3'-dimethyl-4,4'-diaminodiphenylmethane, 3,3'-dichloro-4,4'-diaminodiphenylmethane (MOCA), 1-methyl-3,5-bis(methylthio)-2,4- and/or 2,6-diaminobenzene, 1-methyl-3,5-diethyl-2,4-diaminobenzene and/or 1-methyl-3,5-diethyl-2,6-diaminobenzene (i.e. DETDA), 1,3,5-trimethyl-2,4-diaminobenzene, 1,3,5-triethyl-2,4-diaminobenzene, 1,3,5-triisopropyl-2,4-diaminobenzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene, 3,5-dithiomethyl-2,4-diamino toluene (i.e. ETHACURE 300); 4,6-dimethyl-2-ethyl-1,3-diaminobenzene; 3,5,3',5'-tetraethyl-4,4-diaminodiphenyl-methane; 3,5,3',5'-tetraisopropyl-4,4'-diaminodiphenylmethane; 3,5-diethyl-3',5'-diisopropyl-4,4'-diaminodiphenylmethane; 2,4,6-triethyl-m-phenylenediamine (TEMPDA); 3,5-diisopropyl-2,4-diaminotoluene; 3,5-di-sec-butyl-2,6-diaminotoluene; 3-ethyl-5-isopropyl-2,4-diaminotoluene; 4,6-diisopropyl-m-phenylenediamine; 4,6-di-tert-butyl-m-phenylenediamine; 4,6-diethyl-m-phenylenediamine; 3-isopropyl-2,6-diaminotoluene; 5-isopropyl-2,4-diaminotoluene; 4-isopropyl-6-methyl-m-phenylenediamine; 4-isopropyl-6-tert-butyl-m-phenylenediamine; 4-ethyl-6-isopropyl-m-phenylenediamine; 4-methyl-6-tert-butyl-m-phenylenediamine; 4,6-di-sec-butyl-m-phenylenedianine; 4-ethyl-6-tert-butyl-m-phenylenediamine; 4-ethyl-6-sec-butyl-m-phenylenediamine; 4-ethyl-6-isobutyl-m-phenylene-diamine; 4-isopropyl-6-isobutyl-m-phenylenediamine; 4-isopropyl-6-sec-butyl-m-phenylenediamine; 4-tert-butyl-6-isobutyl-m-phenylenediamine; 4-cyclopentyl-6-ethyl-m-phenylenediamine; 4-cyclohexyl-6-isopropyl-m-phenylenediamine; 4,6-dicyclopentyl-m-phenylenediamine. Such diamines may, of course, also be used as mixtures.

In addition, aromatic polyamines may be used in admixture with the sterically hindered chain extenders and include, for example, 2,4- and 2,6-diamino toluene, 2,4'- and/or 4,4'-diaminodiphenylmethane, 1,2- and 1,4-phenylene diamine, naphthalene-1,5-diamine and triphenyl-methane-4,4',4"-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene.

Preferred chain extenders are ethylene diamine (EDA), 1,3-bis(aminomethyl)benzene (MXDA), 1,3,3-trimethyl-1-aminomethyl-5-aminocyclohexane (IPDA), and various isomers of and isomeric mixtures of diethyltoluenediamine (DETDA). A preferred isomeric mixture comprises 75 to 81% by wt. of the 2,4-isomer of diethyltoluene diamine and 19 to 25% by wt. of the 2,6-isomer of diethyltoluenediamine. A particularly preferred compound to be used as (c) herein is IPDA.

Diamines are an integral part of the current invention. Besides their positive contribution to the physical properties, e.g., increased hardness and flexural modulus, of the polyurethaneureas, they act as viscosity modifiers that serve to assure that the polyurethaneureas remain where they are applied onto the surface of the substrate onto which they are sprayed. Diamines prevent the polyurethaneureas from running off vertical surfaces to which they are applied by rapidly increasing the mix viscosity of the reacting polyurethaneurea without increasing the viscosity of the individual components (A) or (B) prior to mixing.

Catalysts can also be used in this invention however; it is desirable that they catalyze the through cure of the reacting polyurethaneurea mass instead of the initial cure. Suitable catalysts that can be used are bismuth-containing catalysts such as COSCAT 83 available from Cosan Chemical Co., tertiary amines, such as triethylamine, dimethylethanolamine, triethylene diamine (DABCO), bicyclic amidines such as 1,8-diazabicyclo(5.4.0)undec-7-ene (DBU), as well as organometallic catalysts such as stannous octate, dibutyltin dilaurate, dibutyltin mercaptide and the like. Other suitable catalysts are disclosed in U.S. Pat. No. 5,233,009, the disclosure of which is hereby incorporated by reference. Preferably, the catalyst is an acid blocked version of triethylene diamine. These catalysts are referred to as delayed action to those skilled in the art. Suitable versions of this type delayed action catalysts are available from Air Products under the tradename Dabco®.

One or more additives to absorb moisture can be included in the isocyanate-reactive component (or the isocyanate component). A particularly suitable such additive is molecular sieve, e.g., a synthetic zeolite, which is typically added to the polyol component as a mixture with castor oil (1:1 weight ratio). Materials of this type are available from UOP, LCC, a Honeywell company located in Des Plaines, Ill. Other suitable drying agents include natural zeolite having a particle size of not greater than about 5 microns and a pore size of about 2.5 to 4.5 Angstroms. Preferably, about 2 to 20 parts by weight of a drying agent are used, and more preferably about 5 to 10 parts by weight, per 100 parts by weight of the isocyanate-reactive component.

Other additives can be included in the isocyanate-reactive component (or the isocyanate component, although this is not preferred). For example, antifoaming agents typically used in polyurethaneurea compositions, such as polysiloxane antifoaming agents, can be used to decrease the amount of foaming. Antifoaming agents can be used either individually or in admixture. Typically, no more than about 0.2 to 0.5 parts by weight of an antifoaming agent, based on 100 parts by weight of the isocyanate-reactive component.

Other additives that can be used in either the isocyanate-reactive component (or the isocyanate component, although this is not desired) include, for example, emulsifiers, surface-active stabilizers, pigments, dyes, UV-stabilizers, plasticizers, flame-retardents, fungicides, and bacteriocides.

The polyurethaneurea layer of the invention may additionally comprise one or more fillers. Suitable fillers are present in amounts of from 0 to 50, preferably 10 to 40 and more preferably 15 to 35% by weight, based on 100% by weight of the filled polyurethaneurea.

Typically and preferably, a filler material is added just prior to the time when the isocyanate component and the polyol component are combined. The filler material is normally added to the isocyanate reactive component prior to combining it with the isocyanate component. The filler material should be relatively dry. Preferably, it should have less than about 2% moisture content, and more preferably less than about 0.05% moisture content. Suitable fillers to be used in accordance with the present invention includes inorganic compounds such as, for example, compounds such as glass in the form of flakes, cut fibers, or microspheres; ceramic microspheres, mica, wollastonite; muscovite mica; carbon fibers; carbon black; talc; and calcium carbonate. Suitable organic compounds include, for example, organic fibers (such as polyamide fibers), expanded microspheres which are known and described in, for example, U.S. Pat. Nos. 4,829,094, 4,843,104, 4,902,722 and 5,244,613, the disclosures of which are herein incorporated by reference. These include commercially available microspheres such as, for example, Dualite M6017AE, Dualite M6001AE and Dualite M6029AE, all of which are available from Pierce and Stevens Corporation, and Expandocel which is available from Akzo Nobel Industries. Useful fillers also included materials such as, for example, alumina trihydrate, recycled calcium carbonate, recycled alumina trihydrate, fly ash, recycled tire crumb, barium sulfate, silica, silica flour, barytes, ceramic spheres and fibers, boron, graphite, wollastonite, kieselguhr, fillers providing color like carbon black and titanium dioxide, and the like. Such fillers can be used to improve thermal conductivity, electrical conductivity, tensile strength, flexural modulus, color, etc. They can be used in the form of fibers, spheres, platelets, powders, pellets, etc. Preferred fillers are substantially inert under the conditions encountered when the components of the invention are mixed. Fillers can be used either individually or in admixture. Preferred fillers are mica, talc, calcium carbonate, and alumina trihydrate.

The polyurethaneurea layers of the present invention may additionally comprise glass fibers. In accordance with the present invention, glass fibers are typically present in an amount of at least 2% by weight, preferably at least 5% by weight and more preferably at least 7% by weight. The glass fibers are also typically present in the polyurethaneurea layers in amounts of less than or equal to 25% by weight, preferably less than or equal to 20% by weight, and preferably less than or equal to 16% by weight. The glass fibers may be present in the polyurethaneurea layers in amounts ranging between any combination of these upper and lower values, inclusive, e.g. from 2% to 25% by weight, preferably from 5% to 20% by weight, and more preferably from 7% to 16% by weight. The % by weight of the glass fibers is based 100% by weight of the polyurethaneurea layer and glass fibers present (i.e. 100% by weight of the sum of the weight of the polyurethaneurea layer and of the weight of the glass fibers).

The glass is usually introduced into the polyurethaneurea in a continuous operation whereby continuous strands of the glass are chopped into a stream of the polyurethaneurea as it is applied onto the gel coat surface. The glass is typically chopped into ¼ to 1½ inch lengths. Longer lengths provide better impact resistance of the polyurethaneurea layers whereas shorter lengths provide smoother surfaces. Shorter lengths are preferred for the current invention.

In accordance with the present invention, the solid polyurethaneurea layer will typically have an NCO Index of from about 95 to about 120, and preferably from about 97 to about 105.

In accordance with the present invention, the polyurethaneurea foam layers of the composite articles are sprayable and comprise the reaction product of a polyisocyanate component, an isocyanate-reactive component and water. In the present invention, the composition of the foam layer may be the essentially same as that described above for the solid polyurethaneurea layer, with the exception that the foam layer additionally comprises water as a blowing agent. Thus, the same components which are described above as being suitable for components (A)(1) and (A)(2), and for components (B)(1), (B)(2) and (B)(3) are also suitable for preparing the isocyanate prepolymer component (A) and the isocyanate-reactive component (B) of the foam layer of the invention.

It is also possible, however, that the foam layer (II) of the present invention comprise a different isocyanate component than that which is described above as component (A), and/or a different isocyanate-reactive component than that which is described above as component (B). In this embodiment, virtually any of the isocyanate components which are known to be suitable for preparing polyurethaneureas may be used as component (A) for the foam layer, and virtually any of the isocyanate-reactive components which are known to be suitable for preparing polyurethaneureas may be used as component (B) for the foam layer. Water is again used as the blowing agent.

In the polyurethaneurea foams of the present invention, water is typically used in an amount of from 0.05% to 2% by weight, preferably 0.1% to 1% and most preferably 0.3% to 0.7% by weight, based on the entire weight of the polyurethaneurea foam and filler when present in the foam.

The foam layer may be prepared from two components, i.e. an isocyanate component and an isocyanate-reactive component which additionally comprises water; or from three components, i.e. an isocyanate component, an isocyanate-reactive component, and a third component which comprises water, catalysts, and surfactants, and optionally, one or more polyol components. A two-component machine is used for mixing and spraying when two components are used to prepare the foam, and a three-component machine is used for mixing and spraying when three components are used to prepare the foam.

Suitable catalysts and surfactants to be used in preparing the PUR foam layers of this invention include those which are described in, for example, U.S. Pat. Nos. 5,064,873, 5,109,031, 6,245,826 and 6,762,214, the disclosures of which are hereby incorporated by reference.

The ratio of NCO to active H in the foam layers according to the invention ranges from 0.95:1 to 1.20:1 and preferably from 0.97:1 to 1.05:1. The phrase active H as used herein refers to active hydrogen which includes the OH and NH groups in the polyols, amines and water which are reactive with NCO groups of the isocyanate component.

In addition, the foam layer of the PUR composites of the invention may optionally contain one or more fillers. Suitable fillers include those which are described above as fillers for the solid PUR layer(s) of the invention. The quantity of filler used in the foam is typically such that the density of the foam layer ranges from 0.1 to 0.9 g/ml, preferably from 0.2 to 0.7 g/ml and most preferably from 0.3 to 0.5 g/ml.

In a preferred embodiment, a three component machine is used in which the third component contains water. To prepare the solid layers, the third component is not used. To prepare the foam layers, the third component is added and the amount of isocyanate is increased to accommodate for the additional isocyanate-reactive groups including water. This facilitates the production of composites and eliminates the need for a second machine.

In the case when two machines are used, one utilizes an isocyanate-reactive component that does not contain water to prepare the solid layers in the first machine and an isocyanate-reactive component that does contain water in the second machine.

The composites of the invention comprise at least one layer of the sprayable polyurethaneurea which cures to form a solid (i.e. non-cellular) layer, and at least one layer of the sprayable polyurethaneurea foam which comprises the reaction product of an isocyanate component, an isocyanate-reactive component and water. These layers of solid polyurethaneurea and foamed polyurethaneurea are typically applied in an alternating manner such that the cured composite comprises a layer of solid polyurethaneurea, a layer of foamed polyurethaneurea, and a layer of solid polyurethaneurea. Additional alternating layers may be present.

In accordance with the present invention, the process for producing the composites herein comprises (A) spraying (I) the polyurethaneurea composition as described above and which forms a solid layer upon curing onto a suitable substrate; (B) spraying (II) the polyurethaneurea foam forming composition described above onto the polyurethaneurea layer formed in (A). The polyurethaneurea foam forming composition comprises the reaction product of an isocyanate component, an isocyanate-reactive component and water.

In accordance with the present invention, the composites typically comprise at least 1 layer of (I) the polyurethaneurea composition which forms a solid upon curing, and preferably at least 2 layers of (I) the polyurethaneurea composition which forms a solid upon curing. The composites of the present invention will also contain at least 1 layer of (II) the polyurethaneurea foam component, and optionally additional layers of the polyurethaneurea foam component. Thus, in accordance with the present invention, these composites comprise from 1 to 2 layers of polyurethaneurea component and 1 layer of polyurethaneurea foam component. It is preferred that sandwich type composites are formed from (at a minimum) a first layer of solid polyurethaneurea, a first layer of foamed polyurethaneurea, and a second layer of solid polyurethaneurea.

The composites of the present invention are prepared by (A) spraying a layer of the polyurethaneurea composition onto a suitable substrate, (B) spraying a layer of the polyurethaneurea foam forming composition onto the layer of polyurethaneurea, and subsequently spraying additional alternate layers of polyurethaneurea and polyurethaneurea foam forming composition, until the desired number of layers and/or desired thickness of the composite is attained.

The total thickness of each individual layer of the sprayable polyurethaneurea (I) which forms a solid is at least about 0.1, preferably at least about 0.5 and most preferably at least about 1.0 mm thick. Each individual layer of the sprayable polyurethaneurea which forms a solid also typically has a total thickness of less than or equal to 10, preferably less than or equal to 50, and most preferably less than or equal to 3.0 mm thick. In addition, the thickness of each individual layer of the sprayable polyurethaneurea may range between any combination of these upper and lower values, inclusive, e.g. from about 0.1 to about 10, preferably from about 0.5 to about 5 and most preferably from about 1.0 to about 3.0 mms thick.

The total thickness of each individual layer of the polyurethaneurea foam (II) is at least about 0.5, preferably at least about 2 and most preferably at least about 3 mm thick. Each individual layer of the polyurethaneurea foam also typically has a total thickness of less than or equal to 30, preferably less than or equal to 20, and most preferably less than or equal to 15 mm thick. In addition, the thickness of each individual layer of the polyurethaneurea foam may range between any combination of these upper and lower values, inclusive, e.g. from about 0.5 to about 30, preferably from about 2 to about 20 and most preferably from about 3 to about 15 mms thick.

In accordance with the present invention, the composites are produced by spraying the polyurethaneurea formulation onto a mold or gel coated mold and then removing the composite from the mold. In a preferred embodiment, the composites are produced by spraying the polyurethaneurea formulation onto thermoformed shell such as an acrylic shell, an ABS shell, or a laminate thereof. The sprayable polyurethaneureas of the present invention may also be suitable as reinforcing layers to stiffen thin layers of thermoformed acrylic and/or ABS parts. These polyurethaneureas are sprayed at a temperature ranging between 15° C. and about 100° C., and preferably about room temperature. In practice, it is advantageous to heat the isocyanate-reactive component containing filler to a temperature that makes the viscosity of the mixture closer to that of the isocyanate component in order to facilitate mixing. It is preferred that the substrate temperature remains less than about 80° C.

When preparing the composites of the present invention, it is preferred to apply the layers of the same component (i.e. polyurethaneurea component, or polyurethaneurea foam forming component urea) as quickly as possible while maintaining the substrate temperature below about 80° C. By applying the layers of the same component as quickly as possible, the overall manufacturing time is as short as possible. In addition, the maximum time between applying layers of the same component should not exceed about 4 hours. Times greater than 4 hours may result in problems with intercoat adhesion of the individual layers of each component.

The polyurethaneurea solid layer is always applied first. The foam layer can be applied thereon almost immediately thereafter. Preferably, it is applied after the first layer of polyurethaneurea gels but before it is completely tack-free. Once the layer of the polyurethaneurea foam component is applied to the substrate, it must be allowed to cure sufficiently to ensure that it completes rising before applying a subsequent layer of polyurethaneurea (I) which forms a solid layer. This is necessary to ensure proper adhesion between the adjacent layers. The exact amount of time will be dependent on the specific catalyst or catalyst package used in the polyurethaneurea composition which forms the second layer of the composites herein. Different catalysts give different reaction rates and require different temperatures to be activated. Thus, it is possible to change catalysts and/or increase the quantity of catalyst used to decrease the rise time of the polyurethaneurea foam composition herein which forms the second layer. Ideally, the catalyst selected and the amount of catalyst used should be such that the polyurethaneurea composition which forms the foam layer requires at least about 1 and no more than about 10 minutes to rise. What is critical in preparing composites of the present invention is the amount of time between applying the polyurethaneurea layer and applying the polyurethaneurea foam layer. To assure the best adhesion, the amount of time should be sufficient to allow polyurethaneurea to gel but not completely. Time wise, this is very dependent on the catalysis. One can add more catalyst or increase temperature to get quicker cure. Ideally, the time varies between 1 and 10 minutes for each layer.

The gel time of the solid polyurethaneurea composition (I) is at least about 5, preferably at least about 15 and most preferably at least about 60 seconds. Each individual layer of the polyurethaneurea composition (I) also typically has a gel time of less than or equal to 500, preferably less than or equal to 200, and most preferably less than or equal to 120 seconds. In addition, the gel times of each individual layer of the polyurethaneurea composition (I) may range between any combination of these upper and lower values, inclusive, e.g. from about 5 to about 500, preferably from about 15 to about 200 and most preferably from about 60 to about 120 seconds.

The tack free time for each individual layer of the polyurethaneurea composition (I) is at least about 20, preferably at least about 60 and most preferably at least about 120 seconds. Each individual layer of the polyurethaneurea composition (I) also typically has a tack free time of less than or equal to 1000, preferably less than or equal to 500, and most preferably less than or equal to 250 seconds. In addition, the tack free times of each individual layer of the polyurethaneurea composition (I) may range between any combination of these upper and lower values, inclusive, e.g. from about 20 to about 1000, preferably from about 60 to about 500 and most preferably from about 120 to about 250 seconds.

As used herein, unless other noted and/or specified, the term molecular weight refers to the number average molecular weight ($M_n$) and is determined by end group analysis (OH number).

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following-components were used in the working examples.
Iso A: diphenylmethane diisocyanate having an NCO group content of about 34% and comprising 98% by weight of the 4,4'-isomer and 2% by weight of the 2,4'-isomer.
Polyol A: a polyether diol having an OH number of about 28, prepared from propylene glycol, propylene oxide, and ethylene oxide, the weight ratio of propylene oxide to ethylene oxide being 70:30, with about 100% of the OH groups being primary.
Polyol B: a polyether polyol prepared by alkoxylating glycerine with a mixture of propylene oxide and ethylene oxide in a weight ratio of 87:13, with the resultant polyether polyol having an actual functionality of about 2.22 and an OH number of about 28.
Crosslinker A: a crosslinking agent prepared by propoxylating a starter mixture comprising sucrose, propylene glycol and water, with the resultant crosslinking agent having a nominal functionality of about 2.98 and an OH number of about 380.
Crosslinker B: a crosslinking agent prepared by propoxylating a starter mixture comprising sucrose, propylene glycol and water, with the resultant crosslinking agent having a nominal functionality of about 5.8 and an OH number of about 380.
Extender A: 3-aminomethyl-3,5,5,-trimethylcyclohexylamine (IPDA) which has an actual functionality of 2 and a molecular weight of 170.
Catalyst A: a catalyst comprising 33% by wt. of triethylene diamine in 67% by wt. of dipropylene glycol, an amine catalyst, commercially available as Dabco® 33LV from Air Products and Chemicals Inc.
Catalyst B: a catalyst comprising a blocked amine in ethylene glycol which has an OH number of about 895, commercially available as Dabco® 1028 from Air Products and Chemicals Inc.
Hubercarb® W-4: calcium carbonate (commercially available from J. M. Huber, Atlanta, Ga.)
Hymod® SB122CM: alumina trihydrate (commercially available from J. M. Huber, Atlanta, Ga.)
Baylith® L: a zeolite (drying agent), commercially available from UOP LCC, a Honeywell company located in Des Plaines, Ill.
Baytec® RS Additive: an isocyanate reactive mixture containing 20% water, polyol, catalysts, and surfactants having an effective OH number of about 1530 (commercially available from Bayer AG, Leverkusen, Germany)

Example 1

A prepolymer according to the present invention was prepared by the following procedure: 100 parts by weight of Iso A were added to a nitrogen padded reactor. While stirring the isocyanate at 50° C., 3.2 parts by weight of 1-butanol were added. This reaction exothermed to about 60° C. To the 60° C. reaction mixture, 0.008 part by weight of zinc acetylacetonate (ZnAcAc) was added. This mixture was then heated to 90° C. and held for about 1.5 hours. Then, 0.016 part by weight of benzoyl chloride stopper was added, and the reaction mixture was cooled to about 60° C. This formed an allophanate modified MDI having an NCO content of about 29.0% by weight. Finally, 48.9 parts by weight of Polyol A were added to the allophanate modified MDI while at 60° C. This mixture was held at 60° C. for about 1.5 hours, followed by cooling to 25° C. This formed a clear, light yellow product, which was a prepolymer of allophanate modified MDI which contained soft-segments. This prepolymer had an NCO content of about 18.9% by weight, and a viscosity of 440 mPa·s at 25° C.

Example 2

In accordance with the present invention, a solid polyurethaneurea layer which used the soft segment prepolymer described above in Example 1 was prepared from various components using the following formulation:

TABLE 1

Solid Polyurethaneurea Layer

| Component | Parts by weight |
| --- | --- |
| Polyol B | 2.40 |
| Crosslinker A | 31.54 |
| Crosslinker B | 21.02 |
| Extender A | 1.80 |
| Catalyst A | 0.36 |
| Catalyst B | 0.24 |
| Hubercarb ® W-4 | 30.00 |
| Hymod ® SB122CM | 10.00 |
| Baylith ® L | 2.64 |
| Isocyanate from Example 1 | 84.00 |
| Isocyanate Index | 100 |

The density of the solid layer was about 1.3 g/ml.

Example 3

In accordance with the present invention, a foamed polyurethaneurea layer which used the soft segment prepolymer described in Example 1 was prepared from various components using the following formulation:

TABLE 2

Polyurethaneurea Foam Layer

| Component | Parts by weight |
| --- | --- |
| Polyol B | 2.36 |
| Crosslinker A | 31.02 |
| Crosslinker B | 20.67 |
| Extender A | 1.77 |
| Baytec ® RS Additive | 1.65 |
| Catalyst A | 0.35 |
| Catalyst B | 0.24 |
| Hubercarb ® W-4 | 29.51 |
| Hymod ® SB122CM | 9.83 |
| Baylith L | 2.60 |
| Isocyanate from Example 1 | 95.50 |
| Isocyanate Index | 105 |

The foamed layer was prepared using a three component mixing device and spray gun so that the Baytec® RS Additive was introduced into the reacting mixture at the same time as the isocyanate prepolymer and polyol blend. The density of the foam layer was about 0.4 g/ml.

Example 4

In accordance with the present invention, a sandwiched composite panel consisting of two 1.5 mm thick layers of solid polyurethaneurea and with one 5.0 mm thick foamed polyurethaneurea layer between them was spray applied onto a sheet of polyethylene using the process described below, and removed after curing for about 10 minutes. A first layer of the polyurethaneurea formulation shown in Table 1 above was sprayed onto the polyethylene sheet, to form a layer of about 1.5 mm thick. This layer was allowed to cure for about 3 minutes. Next, a layer of the polyurethaneurea foam formulation set forth in Table 2 above was sprayed onto the tacky first layer of polyurethaneurea. A sufficient amount of the polyurethaneurea foam formulation was sprayed to form a 5.0 mm thick layer of foam. This layer was allowed to rise and cure for about 5 minutes. Finally, a second layer of the polyurethaneurea formulation shown in Table 1 was sprayed onto the polyurethaneurea foam layer to form another layer about 1.5 mm thick. This composite was allowed to cure for about 10 minutes before removing it from the polyethylene sheet.

The density of the composite was about 1.1 g/ml. The Charpy (ISO 179) impact resistance of this composite was 10 ft·lb/in$^2$ which is significantly higher than the impact resistance of a composite of a system prepared in accordance with U.S. Pat. No. 5,856,371.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A composite article comprising:
   (I) at least one layer comprising a sprayable polyurethaneurea composition which comprising:
      (A) an isocyanate prepolymer having an NCO group content of about 15 to about 30% by weight, and which comprises the reaction product of
         (1) one or more diphenylmethane diisocyanate which is optionally modified with allophanate groups and/or carbodiimide groups,
         with
         (2) a polyether polyol having a functionality of about 1.8 to about 3.5 and a molecular weight of about 1500 to about 8000;
      and
      (B) an isocyanate-reactive component comprising:
         (1) no more than 5% by weight of one or more high molecular weight polyether polyols having a functionality of about 1.8 to about 3.5 and a molecular weight of about 1500 to about 8000;
         (2) from about 90 to about 98% by weight of one or more crosslinking agents having a molecular weight of 200 to less than 1500 and a functionality of about 2.5 to about 8;
         and
         (3) from about 0.5 to 10% by weight of at least one chain extender having a functionality of about 2 and a molecular weight of about 60 to about 250;
         with the sum of the %'s by weight of (B)(1), (B)(2) and (B)(3) totaling 100% by weight of component (B);

wherein components (A) and (B) are present in amounts such that the isocyanate index is about 95 to about 120
and
(II) at least one polyurethaneurea foam layer which is sprayable and comprises the reaction product of a polyisocyanate component, an isocyanate-reactive component and water.

2. The composite article of claim 1, comprising alternating layers of (I) said sprayable polyurethaneurea, and (II) said polyurethaneurea foam.

3. The composite article of claim 1, comprising
(I) two layers of sprayable polyurethaneurea,
and
(II) one polyurethaneurea foam layer,
with the foam layer positioned between the two layers of sprayable polyurethaneureas.

4. The composite article of claim 1, wherein (I) the sprayable polyurethaneurea compositions additionally comprise one or more fillers.

5. The composite article of claim 1, wherein (A)(1) said diphenylmethane diisocyanate comprises from 0 to 60% by weight of the 2,4'-isomer, from 0 to 6% by weight of the 2,2'-isomer and from 36 to 100% by weight of the 4,4'-isomer, with the sum of the %'s by weight of the isomers totaling 100% by weight.

6. The composite article of claim 1, wherein the isocyanate component comprises a mixture of polyphenylmethylene polyisocyanate with (A) said isocyanate prepolymer.

7. A process for the production of a polyurethaneurea composite comprising:
(A) spraying (I) a polyurethaneurea composition onto a suitable substrate; wherein said polyurethaneurea comprises:
(a) an isocyanate prepolymer having an NCO group content of about 15 to about 30% by weight, and which comprises the reaction product of
(1) one or more diphenylmethane diisocyanate which is optionally modified with allophanate groups and/or carbodiimide groups,
with
(2) a polyether polyol having a functionality of about 1.8 to about 3.5 and a molecular weight of about 1500 to about 8000;
and
(b) an isocyanate-reactive component comprising:
(1) no more than 5% by weight of one or more high molecular weight polyether polyols having a functionality of about 1.8 to about 3.5 and a molecular weight of about 1500 to about 8000;
(2) from about 90 to about 98% by weight of one or more crosslinking agents having a molecular weight of 200 to less than 1500 and a functionality of about 2.5 to about 8;
and
(3) from about 0.5 to 10% by weight of at least one chain extender having a functionality of about 2 and a molecular weight of about 60 to about 250;
with the sum of the %'s by weight of (b)(1), (b)(2) and (b)(3) totaling, 100% by weight of component (b);
wherein components (a) and (b) are present in amounts such that the isocvanate index is about 95 to about 120;
and
(B) spraying (II) a polyurethaneurea foam forming composition onto the polyurethaneurea coated substrate in (A), in which the polyurethaneurea foam forming composition comprises the reaction product of a polyisocyanate, an isocyanate-reactive component and water.

8. The process of claim 7, additionally comprising
(C) spraying a second layer of (I) the polyurethaneurea composition onto the polyurethaneurea foam layer formed in (B).

9. The process of claim 7, wherein alternate layers of (I) the polyurethaneurea composition and (II) the polyurethaneurea foam are applied.

* * * * *